(12) United States Patent
Primak et al.

(10) Patent No.: US 6,389,448 B1
(45) Date of Patent: May 14, 2002

(54) SYSTEM AND METHOD FOR LOAD BALANCING

(75) Inventors: Leonard Primak, New York; John Gnip, Rego Park, both of NY (US); Gene R. Volovich, Greenwich, CT (US)

(73) Assignee: WARP Solutions, Inc., New York, NY (US)

( * ) Notice: Subject to any disclaimer, the term of this patent is extended or adjusted under 35 U.S.C. 154(b) by 0 days.

(21) Appl. No.: 09/565,259

(22) Filed: May 5, 2000

Related U.S. Application Data (60) Provisional application No. 60/169,196, filed on Dec. 6, 1999.

(51) Int. Cl.[7] .............................................. G06F 13/00
(52) U.S. Cl. ........................ 709/105; 709/225; 709/226; 709/229
(58) Field of Search ................................. 709/104, 105, 709/203, 217, 219, 223, 225, 226, 227, 229, 232, 238

(56) References Cited

U.S. PATENT DOCUMENTS

| | | | |
|---|---|---|---|
| 4,748,558 A | 5/1988 | Hirosawa et al. | |
| 5,459,837 A | 10/1995 | Caccavale | |
| 5,740,371 A | 4/1998 | Wallis | |
| 5,774,660 A | 6/1998 | Brendel et al. | |
| 5,774,668 A | 6/1998 | Choquier et al. | |
| 5,828,847 A | 10/1998 | Gehr et al. | |
| 5,864,535 A | 1/1999 | Basilico | |
| 5,881,238 A | 3/1999 | Aman et al. | |
| 5,898,870 A | 4/1999 | Okuda et al. | |
| 5,915,095 A | 6/1999 | Miskowiec | |
| 5,933,596 A | 8/1999 | Mayhew | |
| 5,933,606 A | 8/1999 | Mayhew | |
| 5,951,694 A | 9/1999 | Choquier et al. | |
| 5,983,227 A * | 11/1999 | Nazem et al. | ................. 707/10 |
| 5,991,808 A | 11/1999 | Broder et al. | |
| 6,006,259 A | 12/1999 | Adelman et al. | |
| 6,006,264 A | 12/1999 | Colby et al. | |
| 6,014,660 A | 1/2000 | Lim et al. | |
| 6,041,307 A | 3/2000 | Ahuja et al. | |
| 6,070,191 A * | 5/2000 | Narendran et al. | ......... 709/226 |
| 6,078,943 A * | 6/2000 | Yu | .............................. 709/105 |
| 6,173,322 B1 * | 1/2001 | Hu | .............................. 709/224 |
| 6,212,565 B1 * | 4/2001 | Gupta | ......................... 709/229 |

* cited by examiner

*Primary Examiner*—Viet D. Vu
(74) *Attorney, Agent, or Firm*—Fulbright & Jaworski LLP (57) ABSTRACT

A system for distributing load between multiple servers where more than one server in a sever cluster receives a request for connection from a client and each server makes a determination of whether or not to respond to the request. Software modules running on the servers monitor and communicate relative abilities of each server to respond to client requests. Each server responding to a percentage of client requests corresponding to its relative ability to respond.

20 Claims, 9 Drawing Sheets

SYSTEM AND METHOD FOR LOAD BALANCING

RELATED APPLICATION

This application is a continuation-in-part of U.S. provisional patent application Serial No. 60/169,196, filed Dec. 6, 1999, which is incorporated by reference in its entirety.

BACKGROUND OF THE INVENTION

The invention relates to the field of data packet management. More specifically, the invention relates to the regulating data packets to and from a cluster or group of data servers.

The evolution over the past 20 years of digital communications technology has resulted in the current distributed client-server data networks, the most well known of which is the Internet. In these distributed client-server networks, multiple clients are able to access and share data stored on servers located at various points or nodes through a given network. In the case of the Internet, a client computer is able to access data stored on a server located at any point on the planet, as long as the server is also connected to the Internet.

With the rapid proliferation in use of distributed data networks such as the Internet, more and more clients from around the world are attempting to connect to and extract data stored on a finite number of servers. Those establishing and maintaining the servers containing the desired data, such as web pages from popular web sites, are finding it difficult to insure that all the clients attempting to access data will be able to do so. A given server can only connect with a finite number of clients at the same time. The number of simultaneous connections a given server can support is a function of the server's computational, storage and communications capabilities. In situations where the number of clients attempting to access data stored on a server exceeds the server's capacity, some clients either will not be able to connect or will be dropped by the server. In other cases where a server is overwhelmed by client requests for data, the server may cease to function altogether.

As a partial solution to the situation described above, server operators will typically deploy multiple mirrored servers, each having data identical to that stored on all the other servers. The mirrored servers are typically connected to the same network and are referred to as a server cluster. In conjunction with the multiple mirrored servers, a load balancer is typically used. When a client attempts to connect to and access data from a server cluster, the client's request is first received by the load balancer which determines which of the servers is best suited to handle the client's request. Various load balancing solutions are commercially available and each uses different techniques and criteria for determining to which server to direct a client's request. However, the common characteristic for each of the currently available solutions is that they all attempt to pick a server which is most capable of responding to the client's request.

An inherent drawback with the load balancing solutions available today is that they all require a device generally referred to as a load balancer. As described above, the load balancer is the first point of contact for each client attempting to access data on the server cluster, and therefore, the maximum rate at which the entire server cluster can receive and respond to client requests is limited by the throughput of the load balancer. It is foreseeable that the number of client requests for data may exceed a load balancer's ability to properly route the requests, and requests will be ignored or dropped despite the fact that the server cluster has sufficient capacity to handle all the request. Another drawback of the currently available load balancers is that when they malfunction, their entire server cluster becomes inoperative.

U.S. Pat. No. 6,006,259 relates to an Internet Protocol (IP) network clustering system wherein it attempts to address the above-mentioned drawbacks by distributing the load balancing responsibilities to all of the servers in the server cluster. However, it does not address the problem of balancing the load between non-uniformly loaded servers in the server cluster. That is, the system considers the available capacity (or the current load) of the server cluster as a group, but not the available capacity of the individual servers in the server cluster. For example, if one server is operating at 90% capacity and another server is operating at 60% capacity, it is desirable that the load balancing system directs more traffic to the lightly loaded server. The present invention advantageously balances load between the servers in the server cluster by directing traffic based on the available capacity of the individual servers in the server cluster.

OBJECTS AND SUMMARY OF THE INVENTION

Therefore, it is an object of the present to overcome the disadvantages of the above-described systems by providing a system and technique for balancing or distributing load between the servers in a server cluster. The present invention is a network load balancing system which is highly scalable and optimizes packet throughput by dynamically distributing the load between the servers in a server cluster.

The present invention includes a server cluster comprising a plurality of servers, with all servers having the same network address, and each server having a load balancing module to generate a connection value for each connection request. A particular server in the server cluster accepts and processes the network connection request based on the connection value. That is, each server is associated with a non-overlapping range of connection values and accepts only connection requests having connection values within that range. The range associated with each server is dynamically adjusted based on the available capacity of each server in the server cluster to thereby dynamically balance the load between the servers.

The servers are connected to the network in parallel such that each server receives every connection request, such as a synchronizing segment or packet (SYN) for transmission control protocol/internet protocol (TCP/IP) connection, substantially at the same time. The SYN packet is the first segment or packet sent by the TCP protocol and is used to synchronize the two ends of a connection in preparation for opening a connection. The load balancing modules on the servers communicate with each other to determine each server's relative ability to accept a new connection (i.e., available capacity).

Various other objects of the present invention will become readily apparent from the ensuing detailed description of the drawings.

BRIEF DESCRIPTION OF THE DRAWINGS

The following detailed description, given by way of example, and not intended to limit the present invention solely thereto, will be best be understood in conjunction with the accompanying drawings:

FIG. 3 is a diagram showing the sub-range of each server in the server cluster of FIG. 2a;

FIG. 4b is a flow diagram illustrating the operation of the load balancing module of FIG. 4a;

FIG. 5 is a diagram showing a client computer connected to the server cluster of FIG. 2a;

DETAILED DESCRIPTION OF THE INVENTION

The present invention is readily implemented using presently available communication apparatuses and electronic components. The invention finds ready application in virtually all data communications system, including but not limited to the Internet, private or public communication networks, wireless networks, satellite networks, cable networks or other online global broadcast networks.

Figure 1:
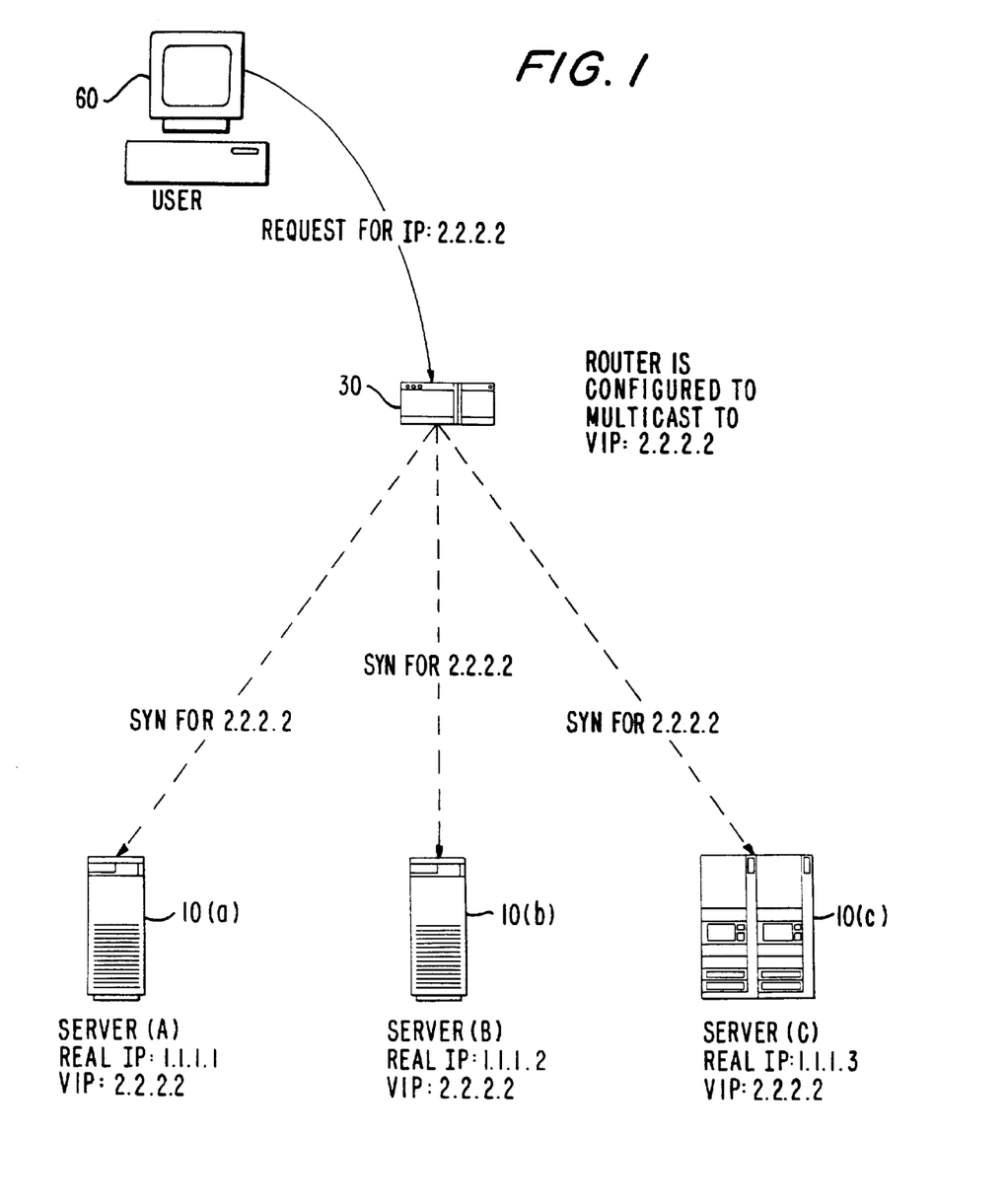
FIG. 1 is a diagram illustrating a network configuration of the present invention.

Turning now to FIG. 1, there is illustrated an example of a TCP/IP network incorporating the load balancing system of the present invention. It is appreciated that the load balancing system of the present invention is not limited to the TCP/IP network, it finds ready application in virtually all data networks employing any conventional data protocol, such as the system network architecture (SNA), CCCIT X.25, etc. A client computer 60 is connected to a router 30 that is connected to servers 10(a)–(c). The client computer 60 accesses data stored on the servers 10(a)–(c) via the router 30. Each server 10 has a unique real IP address and shares a common virtual IP address with all of the servers in the server cluster, e.g., 2.2.2.2. The client computer 60 connects to one of the server in the server cluster by transmitting a connection request. Typically, the connection request is in the form a SYN packet addressed to the server's IP address. After receiving the SYN packet from the client computer 60, the router 30 multicasts the SYN packet to all of the servers 10(a)–(c).

Figure 2A:
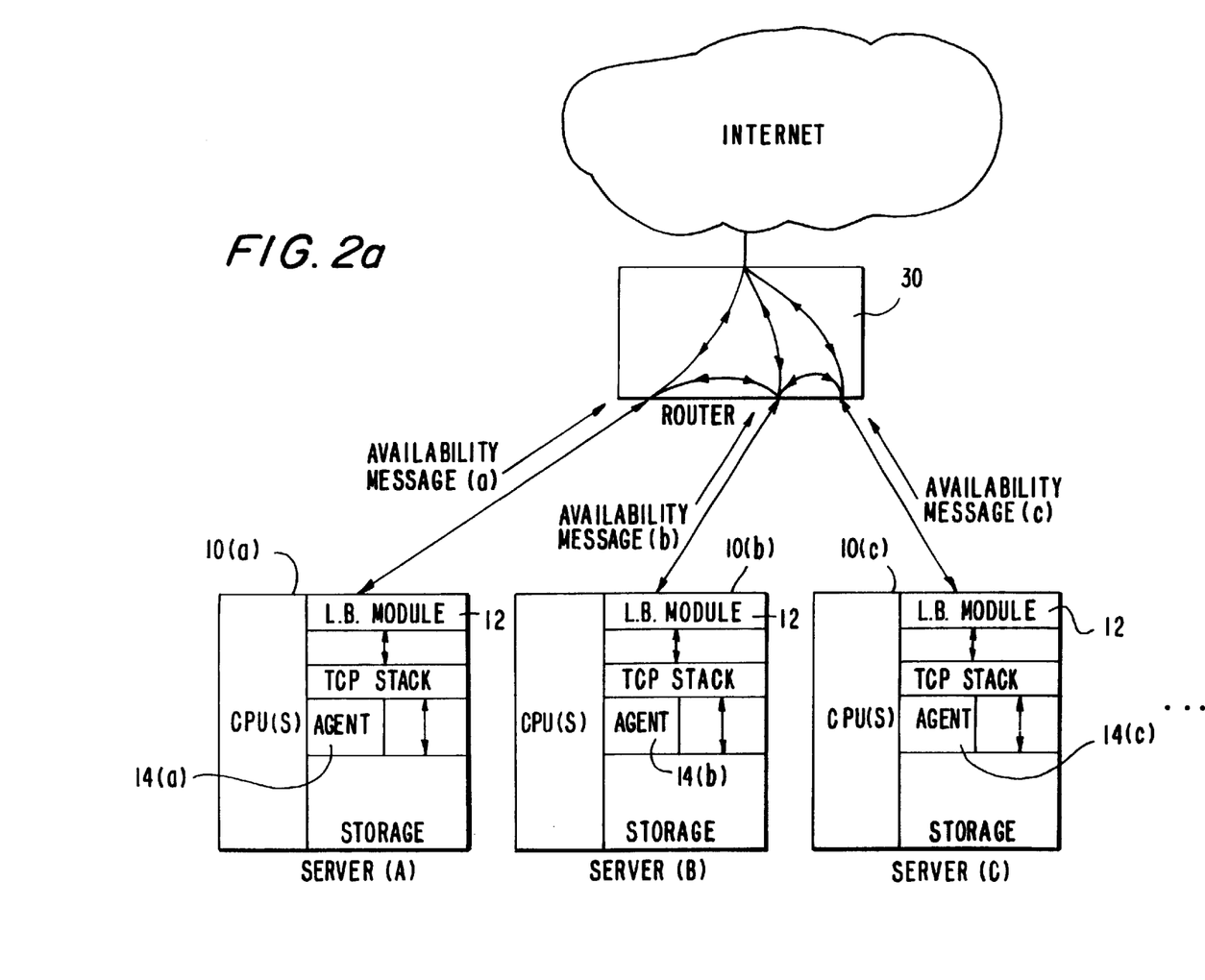
FIG. 2a is a diagram showing the incorporation of an embodiment of the present invention in the Internet.
Figure 2B:
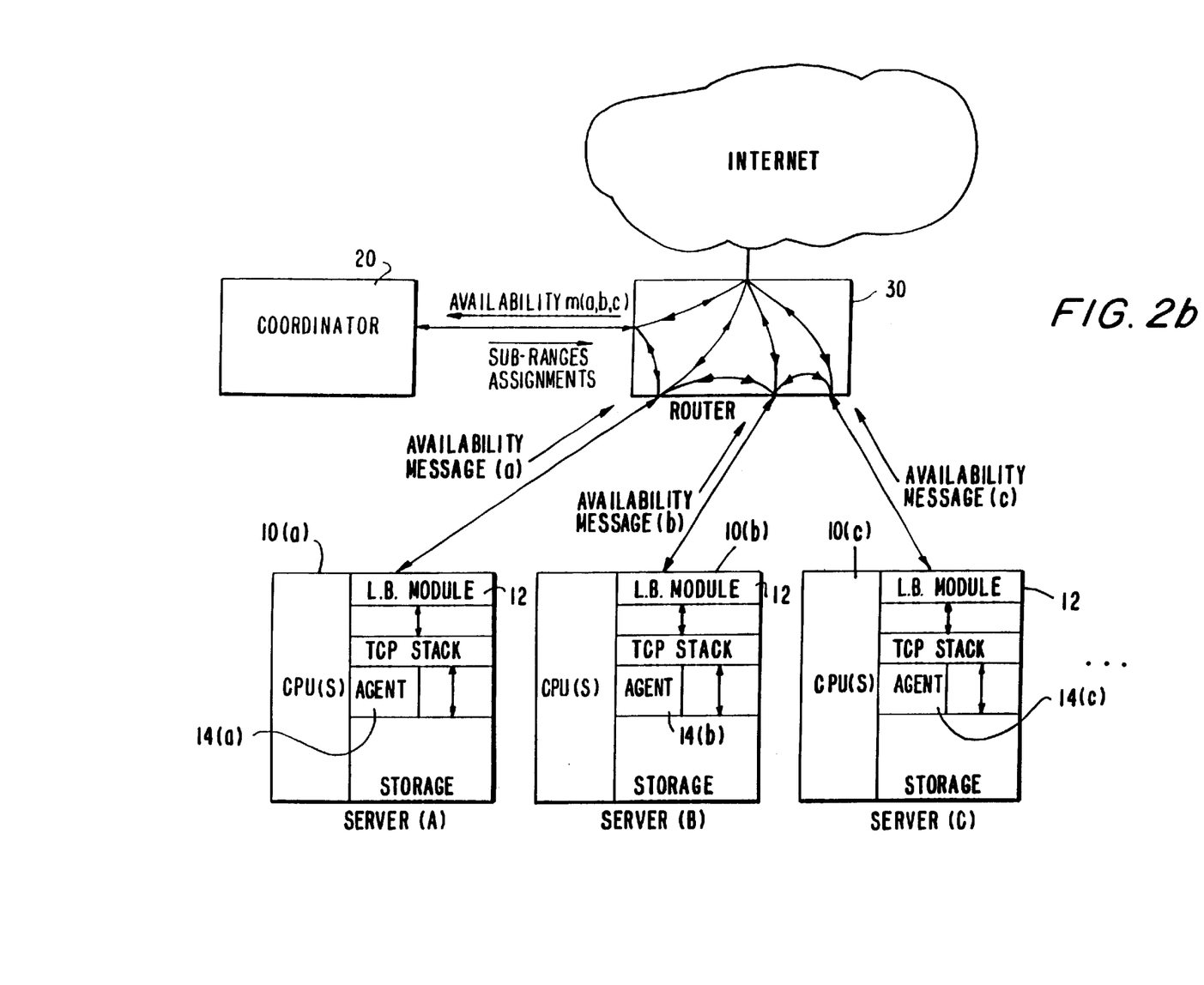
FIG. 2b is a diagram showing the incorporation of another embodiment of the present invention in the Internet.
Figure 7:
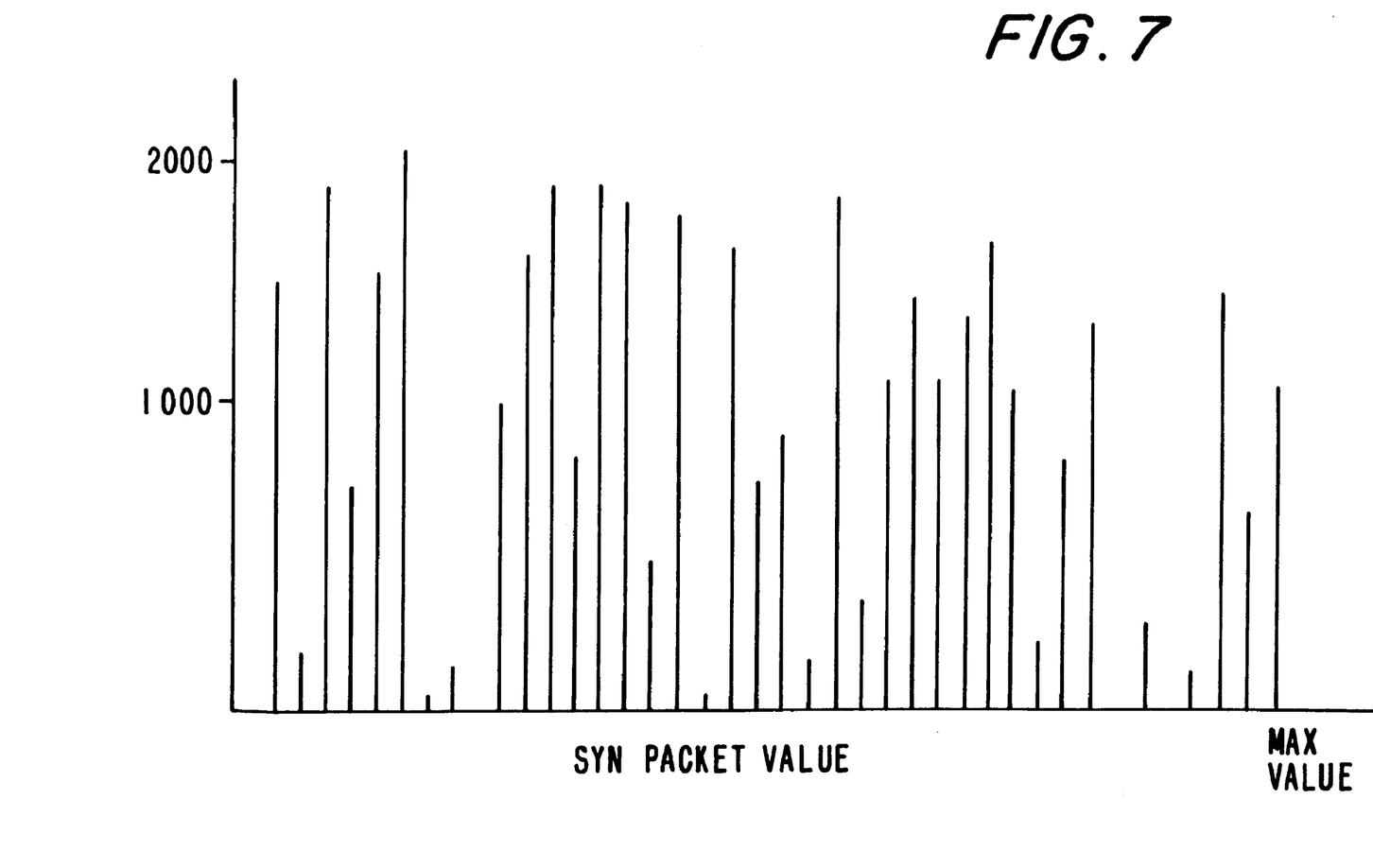
FIG. 7 is a plot of a pseudo-random number generation function.

Turning now to FIGS. 2a and 2b, each SYN packet received by the server is evaluated by a load balancing module 12, preferably a software module, resident in each server 10. The evaluation process involves calculating a pseudo-random number for each SYN packet and determining the relative availability of each server. The load-balancing module 12 either passes the SYN packet onto the server's TCP stack or discards the request based on its evaluation of the SYN packet. The load balancing module 12 calculates a pseudo-random number or a connection value using a portion of the SYN packet as an input. Preferably, the pseudo-random number generation function is characterized by an even probability distribution over a fixed range of values and a zero probability outside the range. FIG. 7 shows an example of a sequence of pseudo-random numbers generated by a suitable pseudo-random number generation function. The pseudo-random number generated for each SYN packet may have substantially equal probability of being any value within a range defined by the pseudo-random number generation function. It is appreciated that the load balancing module 12 may utilize any conventional random generator to calculate the pseudo-random number. Also, it is appreciated that every server in the cluster calculates the identical connection value for each SYN packet.

The relative availability of a server is a function of its overall capacity and current load. It is appreciated that different versions of the servers may have different processing power or capacity. Preferably, an agent program or application 14 resident on each server collects the availability information. The agent 14 can collect the availability information by monitoring one or more of server's internal conditions which affect the server's ability to establish connections with the client computers 60. The monitored conditions may include, but are not limited to, the server's processing (or CPU) capacity, CPU load, number of concurrent processes or tasks being performed, and the number of existing connections. The agent 14 can also monitor other conditions such as the server's internal temperature and power consumption using instruments connected or resident in the server. It is appreciated that electronic temperature gauges and other instruments capable of transmitting readings directly to an application resident on a general purpose computer, i.e., server, are well known to one skilled in the art.

Figure 4A:
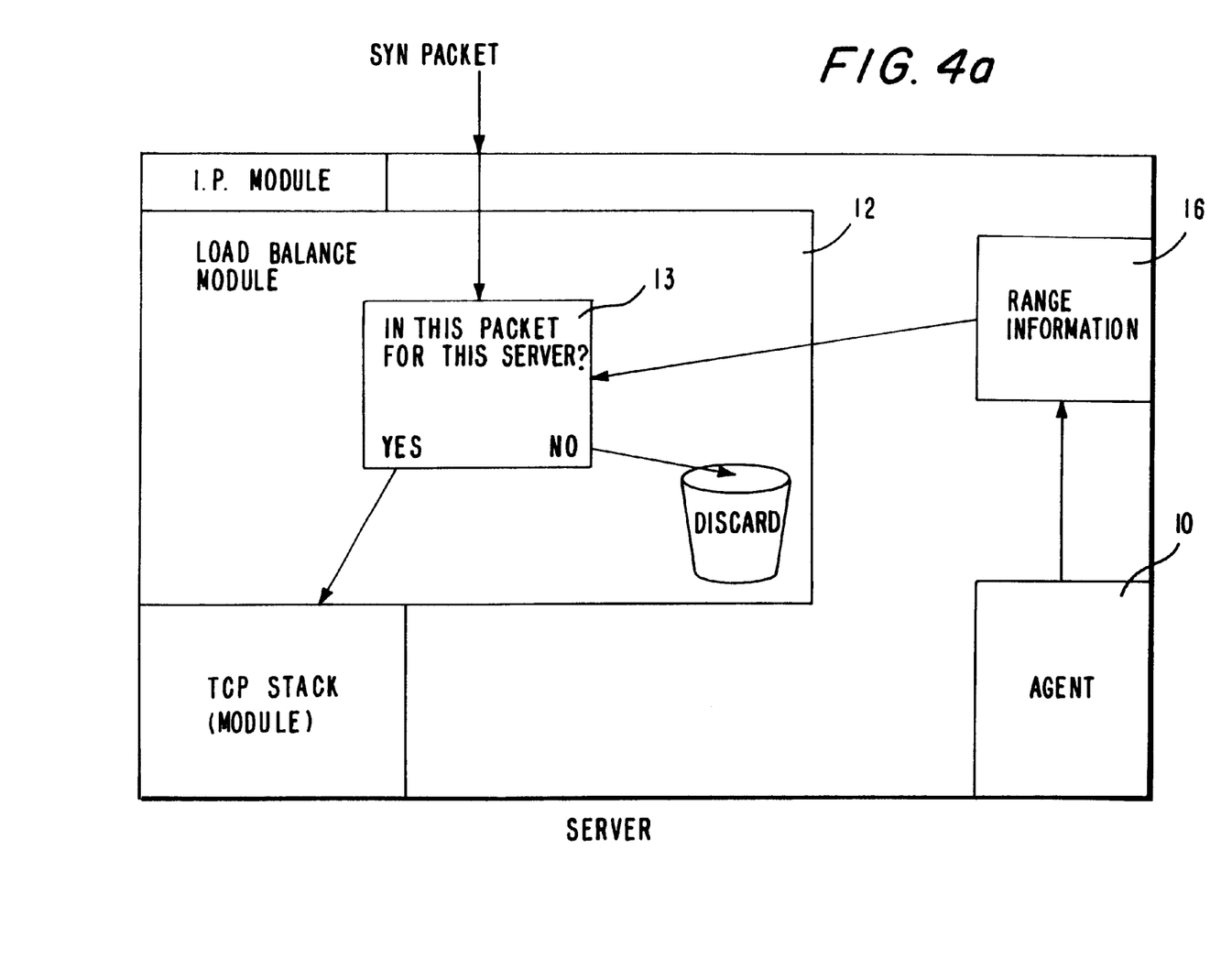
FIG. 4a is a block diagram illustrating the flow of a SYN Packet within a server according to the present invention.

In an embodiment of the present invention as shown in FIG. 4a, the agent 14 records the availability information of its associated server in a pre-defined memory location 16. The agent 14 can periodically transmit the availability information of its associated server either to other servers in the cluster (FIG. 2a) or to a coordinating device 20 (FIG. 2b). As shown in FIG. 2a, each agent 14 broadcasts its respective availability information to all of the servers in the cluster. Alternatively, as shown in FIG. 2b, each agent 14 transmits its respective availability information only to the coordinating device 20. It is appreciated that the coordinating device 20 may be a server or a general purpose computer.

Figure 3:
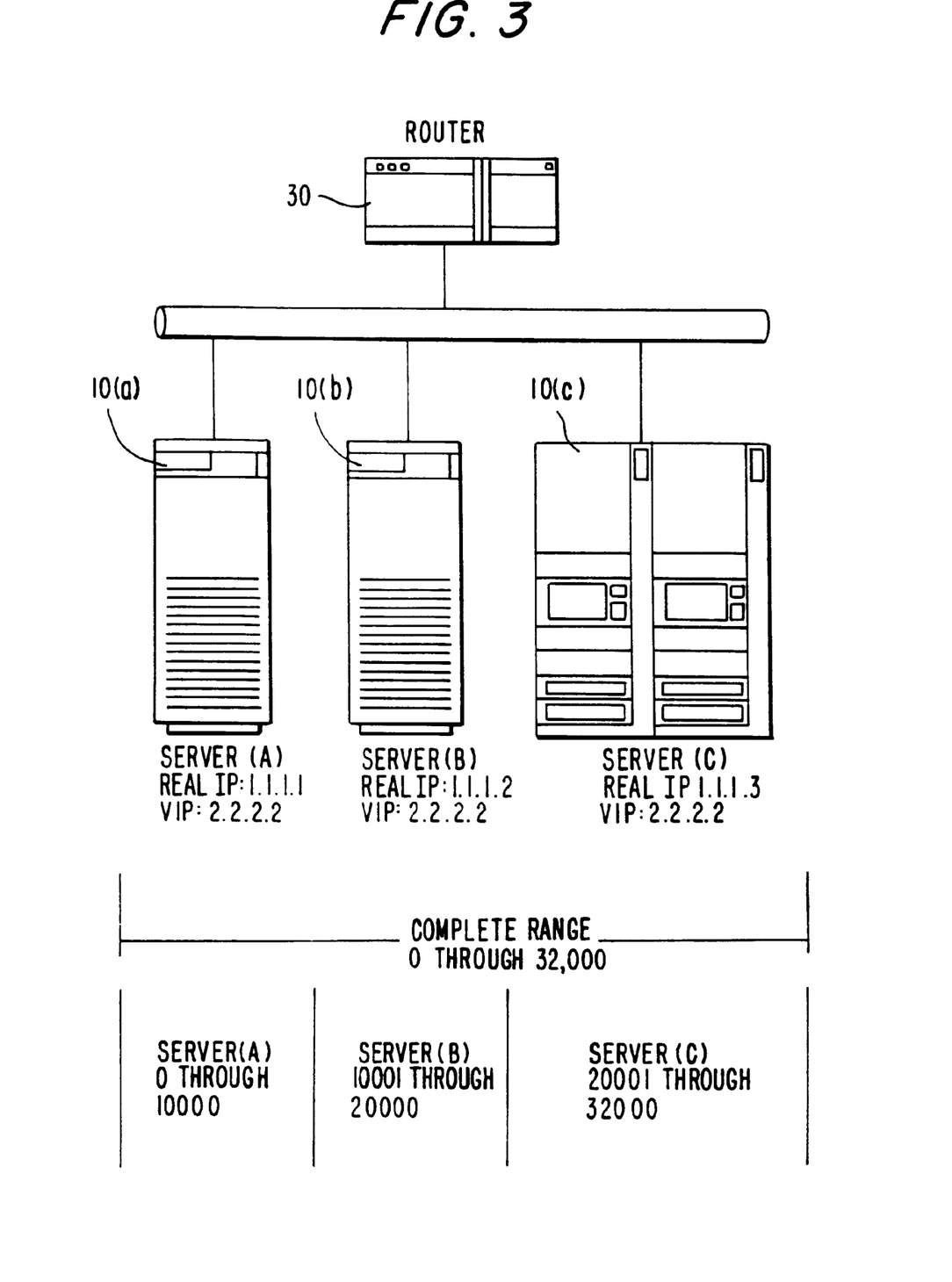
Figure 4B:
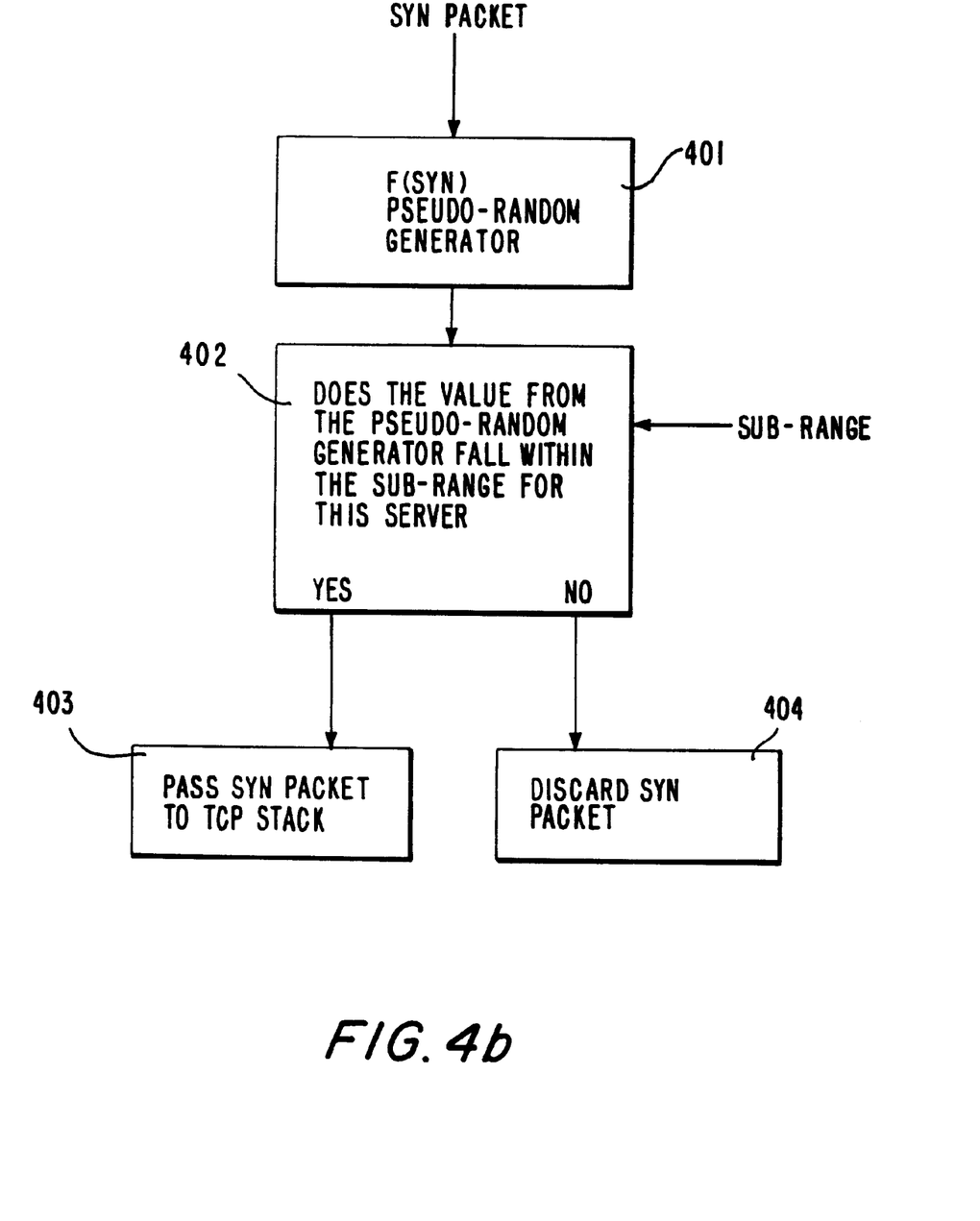
Figure 5:
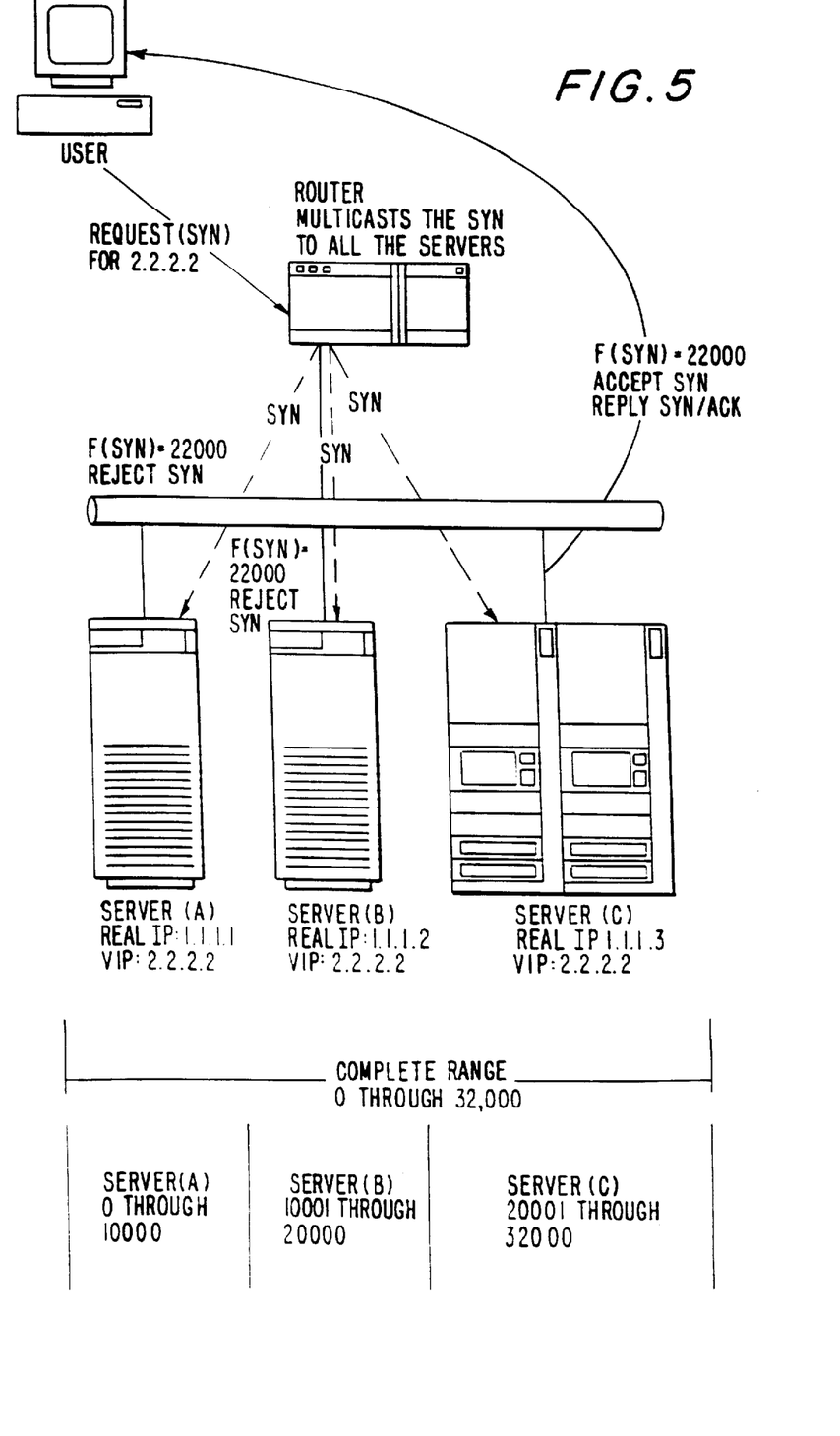

Turning now to an example illustrated in FIG. 3 and the flow diagram in FIG. 4b, the load balancing module 12 resident on each server 10 generates a range of connection values from 0 to 32,000 for each SYN packet at step 401. In other words, every SYN packet has a connection value or number that is between 0 and 32,000, and each connection value is accepted by only one server in the cluster.

Although, the SYN packet is transmitted to each server in the cluster, only one server, namely the associated load balancing module 12, accepts and establishes a connection to the client computer 60 based on the connection value of the SYN packet. The load balancing module 12 on each server compares the connection value of a given SYN Packet to its respective assigned sub-range of connection values at step 402. If the connection value of the SYN packet is within the server's assigned sub-range, the associated load balancing module 12 forwards the SYN packet to the TCP stack and the server accepts the connection request from the client computer 60 that transmitted this SYN packet at step 403. However, if the connection value of the SYN packet is not within the server's assigned sub-range, the associated load balancing module 12 will then simply discard the SYN packet at step 404.

For example, in FIG. 3, the servers 10(a) accepts SYN packet having a connection value between its assigned sub-range of 0 to 10,000, and server 10(b) accepts SYN packet having a connection value between its assigned sub-range 10,001 to 20,000. If the SYN packet has a connection value of 16,000, then the SYN packet will be accepted only by the server 10(*b*), and discarded by servers 10(*a*) and 19(*c*).

Preferably, the assigned sub-range is not static, but dynamically adjusts as a function of each server's availability with respect to the overall capacity of the server cluster. Each server's agent 14 continuously or periodically transmits the server's availability information either to other servers in the cluster or to a coordinating device 20, for example once every two seconds. As this information is received, the sub-range for each server is continuously recalculated such that the size of each server's sub-range is in proportion with that server's availability. For example, a server having 30% of the total availability of a server cluster would be assigned a sub-range whose size would be about 30% of the total range. Given that the connection values for SYN packets are evenly distributed across the entire range, that would result in about 30% of the connection values falling within that server's sub-range, and about 30% of all connection being accepted by that server. Other server's in the cluster are assigned and continually reassigned sub-ranges similarly. If a given server becomes inoperative, the sub-ranges of other servers in the cluster will expand to cover the area no longer covered by the down server. Also, during the transition period wherein the servers are assigned new sub-range of connection values, a given connection value may be associated with more than one server. In such scenario, the connection request may be accepted by two servers, but only one connection will be generally established since most conventional network protocols have mechanism to resolve such conflict. For example, under TCP/IP protocol, two servers transmit their own SYN acknowledgement (ACK) packets to the client computer 60 associated with the SYN packet. The client computer 60 accepts only one SYN ACK packet and rejects the other SYN ACK packet, thereby establishing a single connection between the server cluster and the client computer 60.

In one embodiment of the present invention, each server receives the availability information from each other server and determines its own sub-range. Based on availability information from its own agent 14 and other agents 14 associated with other servers in the cluster, each load balancing module 12 calculates a new sub-range of connection values that it will accept. Alternatively, the coordinating device 20 determines and transmits a new sub-range for each server based on all of the availability information from each server 10. The coordinating device 20 or each server in the cluster continually adjusts the sub-range for each server to reflect the servers' availabilities to accept new connections.

Figure 6:
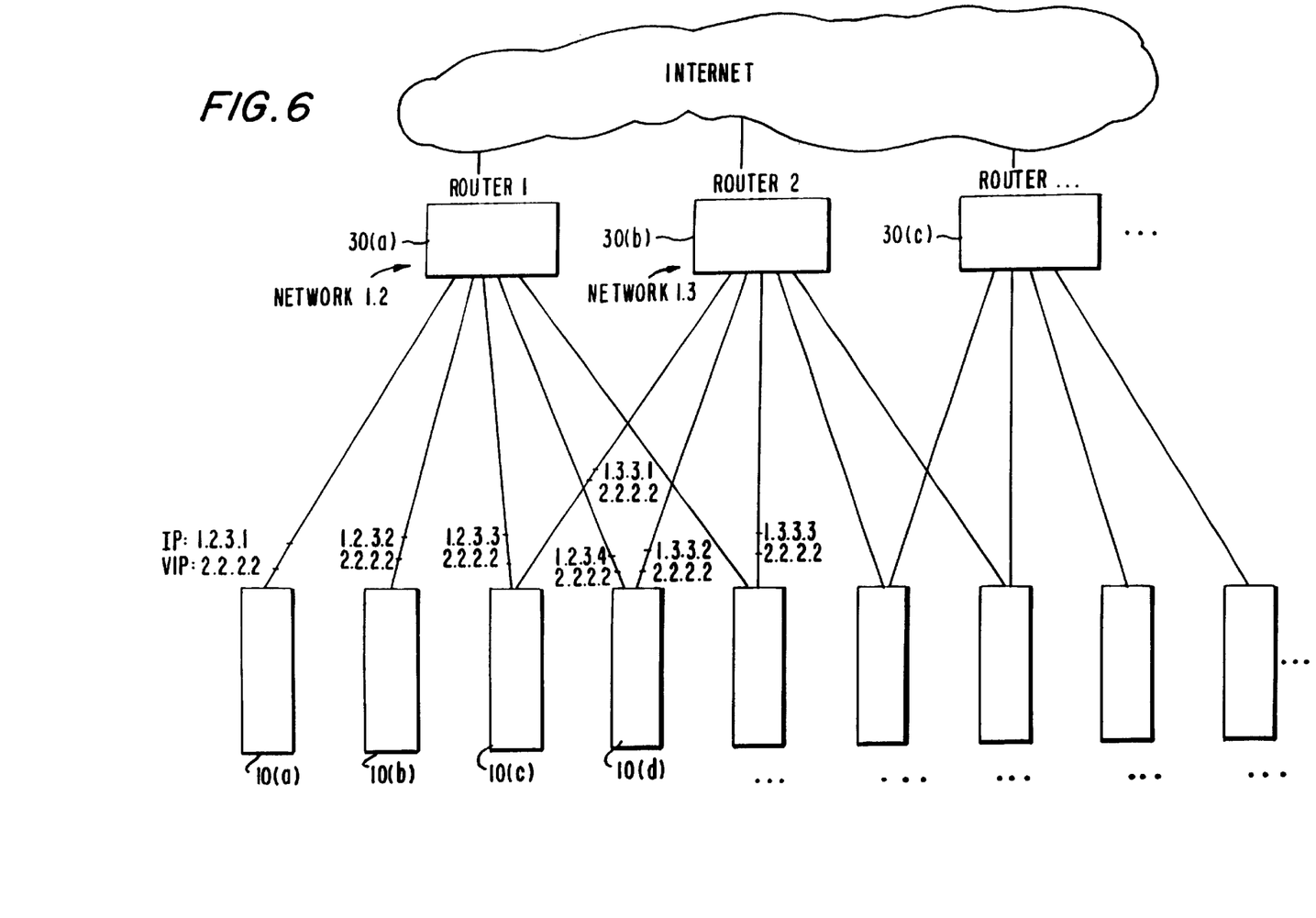
FIG. 6 is a block diagram illustrating a server cluster according to the present invention within a multi-router topology.

In accordance with another embodiment of the present invention, as shown in FIG. 6, the servers are arranged within a multi-router topology. That is, the network routes the data traffic to the servers in the server cluster via multiple routers 30. The multiple-router topology of FIG. 6 increases the reliability of the network in that the servers can receive traffic from multiple routers. For example, the server 10(*c*) in FIG. 6 is connected to routers 30(*a*) and 30(*b*), thereby providing overlapping server coverage. The router 30(*a*) transmits packets, such as SYN packet, addressed to virtual IP address 2.2.2.2 to the servers 10 via network 1.2 and the router 30(*b*) transmits packets addressed to virtual IP address 2.2.2.2 to the servers 10 via network 1.3. Due to the overlapping router coverage, servers may have two different real IP addresses, e.g., server 10(*c*) has real IP addresses of 1.2.3.3 and 1.3.3.1 respectively for routers 30(*a*) and 30(*b*). It is well known in the art that multiple network interface cards (NIC) can be installed in the server to assign multiple real IP addresses to the server, each NIC being uniquely associated with a single real IP address. It is appreciated that each server 10 in the server cluster receives not only packets addressed to its real IP addresses, but also packets addressed to its virtual IP address.

On initiation, the routers 30(*a*) and 30(*b*) broadcast address resolution protocol (ARP) packets to map (or convert) virtual IP addresses, such as 2.2.2.2, to real IP addresses. ARP packets are generally used to dynamically bind a virtual (or high level) IP address to a real (or low-level physical hardware) IP address. For example, server 10(*c*) can answer the ARP with a multicast Ethernet address, such as 01:00:5E:75:C9:3E/IP 224.117.201.62, to which servers 10(*a*)–(*f*) subscribe. Thereafter, the real IP addresses corresponding to the virtual IP address is stored in the router's ARP cache, and all incoming packets destined for the virtual IP address 2.2.2.2 are multicast to the corresponding real IP addresses (or Ethernet addresses). This effectively sends the incoming packets to all of the servers in the server cluster.

While the present invention has been particularly described with respect to the illustrated embodiment, it will be appreciated that various alterations, modifications and adaptations may be made on the present disclosure, and are intended to be within the scope of the present invention. It is intended that the appended claims be interpreted as including the embodiment discussed above, those various alternatives, which have been described, and all equivalents thereto.

What is claimed:

1. A system for distributing load within a network, comprising:
    at least one cluster having a plurality of servers connected to each other, each server in said cluster being addressable by a common network address; and
    a load balancing module in each server for calculating a connection value for each connection request addressed to said network address and for accepting a connection request as a function of available capacity of said respective server with respect to overall available capacity of said cluster and the connection value associated with said connection request.

2. The system of claim 1, wherein said connection value being within a predefined range of values.

3. The system of claim 2, wherein said module in said each server transmits the available capacity of said each server to other servers in said cluster and determines the overall available capacity from the available capacity of said plurality of servers in said cluster.

4. The system of claim 3, wherein said module in said each server determines a sub-range within said predefined range of values as a function of the available capacity of said each server with respect to the overall available capacity, each sub-range not overlapping with another sub-range.

5. The system of claim 4, wherein said connection value being a pseudo-random number; and wherein said module accepts only connection request having a connection value within the sub-range of said associated server.

6. The system of claim 2, further comprising a coordinating device; wherein said module in said each server transmits the available capacity of said each server to said coordinating device which determines the overall available capacity from the available capacity of said plurality of servers in said cluster.

7. The system of claim 6, wherein said coordinating device determines for said each server a sub-range within said predefined range of values as a function of the available capacity of said each server with respect to the overall available capacity, each sub-range not overlapping with another sub-range.

8. The system of claim 7, wherein said connection value being a pseudo-random number; and wherein said module accepts only connection request having a connection value within the sub-range of said associated server.

9. The system of claim 1, wherein said network is either a TCP/IP network or a system network architecture (SNA) network.

10. The system of claim 1, wherein said available capacity of said each server is function of at least one of the following: server's processing or CPU capacity, CPU load, number of concurrent processes or tasks being performed, and number of existing connections.

11. A system for distributing load within a network, comprising:

at least one cluster having a plurality of servers connected to each other, each server in said cluster being addressable by a common network address;

a plurality of routers for routing connection requests to said plurality of servers, each server in said cluster connected to said at least one router; and a load balancing module in each server for calculating a connection value for each connection request addressed to said network address and for accepting a connection request from a router as a function of available capacity of said respective server with respect to overall available capacity of servers connected to said router and the connection value associated with said connection request.

12. The system of claim 11, wherein said connection value being within a predefined range of values.

13. The system of claim 12, wherein said module in each server connected to said router transmits the available capacity of said each server to other servers connected said router and determines the overall available capacity from the available capacity of the servers connected to said router.

14. The system of claim 13, wherein said module in said each server connected to said router determines a sub-range within said predefined range of values as a function of the available capacity of said each server with respect to the overall available capacity, each subrange not overlapping with another sub-range.

15. The system of claim 14, wherein said connection value being a pseudo-random number; and wherein said module accepts only connection request having a connection value within the sub-range of said associated server.

16. A method for distributing load within a network comprising at least one cluster having a plurality of servers connected to each other, each server in said cluster being addressable by a common network address, comprising the steps of:

calculating a connection value for each connection request addressed to said network address by said each server; and accepting a connection request by a server as a function of the connection value associated with said connection request and available capacity of said server with respect to overall available capacity of said cluster.

17. The method of claim 16, wherein said connection value being within a predefined range of values.

18. The method of claim 17, further comprising the steps of:

transmitting the available capacity of said server to other servers in said cluster; and determining by each server the overall available capacity from the available capacity of said plurality of servers in said cluster.

19. The method of claim 18, further comprising the step of determining a sub-range within said predefined range of values for said each server as a function of the available capacity of said each server with respect to the overall available capacity, each sub-range not overlapping with another sub-range.

20. The method of claim 19, wherein said connection value being a pseudo-random number; and wherein said module accepts only connection request having a connection value within the sub-range of said associated server.

* * * * *